(12) United States Patent
Henningsen

(10) Patent No.: US 7,565,740 B2
(45) Date of Patent: Jul. 28, 2009

(54) METHOD FOR STANDARDIZING COAXIAL CABLE JACKET DIAMETERS

(75) Inventor: Jimmy C. Henningsen, Naestved (DK)

(73) Assignee: Corning Gilbert Inc., Glendale, AZ (US)

( * ) Notice: Subject to any disclaimer, the term of this patent is extended or adjusted under 35 U.S.C. 154(b) by 531 days.

(21) Appl. No.: 11/001,885

(22) Filed: Dec. 1, 2004

(65) Prior Publication Data

US 2006/0112549 A1    Jun. 1, 2006

(51) Int. Cl.
*H01R 43/04* (2006.01)
(52) U.S. Cl. ............... 29/862; 29/745; 29/825; 29/828; 29/857; 29/867; 30/90.1; 30/90.2; 30/90.3
(58) Field of Classification Search ........... 29/862, 29/745, 825, 828, 857, 867; 30/90.1, 90.2, 30/90.3
See application file for complete search history.

(56) References Cited

U.S. PATENT DOCUMENTS

| | | | |
|---|---|---|---|
| 3,161,088 A | 12/1964 | Tolman | 81/9.5 |
| 3,407,497 A | 10/1968 | Ratay | 30/91.2 |
| 3,533,313 A | 10/1970 | Matthews | 81/9.5 |
| 4,078,303 A | 3/1978 | Wiener | 30/90.1 |
| 4,366,619 A | 1/1983 | Bieganski | 30/90.1 |
| 4,706,384 A | 11/1987 | Schreiber et al. | 30/91.2 |
| 4,719,697 A | 1/1988 | Schwartzman et al. | 29/867 |
| 4,731,928 A | 3/1988 | Jackson | 30/90.2 |
| 4,934,219 A | 6/1990 | Edwards | 81/9.44 |
| 4,979,299 A | 12/1990 | Bieganski | 30/90.1 |
| 5,009,130 A | 4/1991 | Bieganski | 81/9.4 |
| 5,105,542 A | 4/1992 | Nakajima et al. | 30/90.1 |
| 5,511,305 A | 4/1996 | Garner | 29/828 |
| 6,386,915 B1 * | 5/2002 | Nelson | 439/584 |
| 6,415,499 B1 | 7/2002 | Holland et al. | 29/564.4 |
| 6,427,331 B1 | 8/2002 | Tarpill et al. | 30/90.8 |
| 6,467,171 B2 | 10/2002 | Tarpill | 30/90.2 |
| 6,510,610 B2 * | 1/2003 | Losinger | 30/90.2 |
| 6,513,244 B1 | 2/2003 | Andreescu | 30/90.2 |
| 6,530,152 B1 | 3/2003 | Christensen et al. | 30/90.1 |
| 6,618,945 B2 | 9/2003 | Holland et al. | 30/90.1 |

(Continued)

FOREIGN PATENT DOCUMENTS

EP        0 216 020 A    6/1986

(Continued)

*Primary Examiner*—Thiem Phan
(74) *Attorney, Agent, or Firm*—Matthew J. Mason; Joseph M. Homa

(57) ABSTRACT

A method of preparing the end of a coaxial cable for insertion within a coaxial cable connector involves stripping the cable jacket from the end of the cable, and reducing the outer diameter of the cable jacket portion lying adjacent the stripped portion of the jacket to a relatively constant reduced diameter. The reduced diameter portion of the cable jacket can then be reliably sealed to the back nut of the coaxial connector by an O-ring. A related preparation tool is disclosed for simultaneously stripping the cable jacket from the end of the cable, and reducing the outer diameter of the cable jacket portion lying adjacent the stripped portion, as the tool is rotated about the end of the coaxial cable. The tool may also serve to remove a portion of the outer conductor, as well as a coring member to remove dielectric surrounding the inner conductor of the cable.

4 Claims, 3 Drawing Sheets

U.S. PATENT DOCUMENTS

| | | | |
|---|---|---|---|
| 6,637,101 B2 | 10/2003 | Hathaway et al. | 29/829 |
| 6,668,459 B2 | 12/2003 | Henningsen | 30/90.2 |
| 6,779,273 B1 | 8/2004 | Clifton et al. | 30/90.3 |
| 6,976,872 B1 * | 12/2005 | Wild et al. | 439/578 |
| 2004/0221456 A1 | 11/2004 | Losinger | 30/90.1 |

FOREIGN PATENT DOCUMENTS

| | | |
|---|---|---|
| WO | WO 80/02345 | 10/1980 |

* cited by examiner

METHOD FOR STANDARDIZING COAXIAL CABLE JACKET DIAMETERS

TECHNICAL FIELD

The present invention relates to coaxial cables and connectors therefor, and more particularly, to a method for standardizing the outer diameter of the coaxial cable jacket adjacent a prepared end thereof, and to a preparation tool for practicing such method.

BACKGROUND OF THE INVENTION

Coaxial cables are widely used in the industry to distribute signals. Such cables include a central inner conductor surrounded by a low loss, high dielectric foam. The foam dielectric is, in turn, surrounded by a metallic outer conductor which may be cylindrical or corrugated. A protective insulating jacket, or sheath, surrounds the metallic outer conductor. The ends of such coaxial cables must be connected to junction boxes, amplifiers, and other coaxial ports, and coaxial connectors are well known for terminating the ends of coaxial cables. One example of such a coaxial cable connector is disclosed in U.S. Pat. No. 6,183,298 to Henningsen. The connector disclosed in the Henningsen '298 patent includes a main body, a bushing or back nut, a center conductor, and an insulator supporting the center conductor within the main body.

When designing such connectors for manufacture, one of the principal design goals is to minimize the possibility that water or moisture will migrate through the connector from the external environment and degrade the mechanical and/or electrical characteristics of the connector. Degradation of the electrical characteristics of the connector can have a detrimental impact upon the ability of a cable system operator to provide reliable signal transmission.

In order to maintain a desired characteristic impedance within the coaxial cable, manufacturers of coaxial cable tightly control the diameters of the inner conductor, the outer conductor, and the dielectric material that lies between such conductors. On the other hand, since the outer jacket of the cable does not affect the transmission characteristics of the coaxial cable, manufacturing tolerances of such protective outer jackets are not held to the same standards. Nonetheless, one of the points at which water or moisture can be introduced into such a coaxial connector is at the junction between the coaxial cable outer protective jacket and the back nut of the connector. The most common practice used by manufacturers of coaxial connectors to prevent moisture migration at the interface between the back nut and the cable jacket is to install a sealing within the back nut for being compressed between the inner bore of the back nut and the cable jacket.

The use of sealing in the manner explained above does not truly solve the problem of moisture migration over time. While a given coaxial connector may be designed for use with a number of different brands of coaxial cable, the variance in cable jacket outer diameter dimensions from brand to brand (and sometimes within the same brand), sealing are compressed to a greater or lesser extent. When the pressure exerted on the O-ring (e.g.) varies widely, its ability to seal the interface can be jeopardized. Ideally, an O-ring should only be pressurized to about 10-20% of thickness. However, in order to maintain O-ring pressurization within such range, variations in the outer diameter of the cable jacket would need to be held to 0.30-0.50 mm. In contrast, the dimensions of the outer diameter of the cable jacket often vary between 1 to 2 mm.

Moreover, even if the thickness of the cable jacket were more rigorously controlled, leakage paths can still develop due to irregularities introduced into the outer surface of the cable jacket. For example, such irregularities can be cause by the corrugations in the outer conductor, which effectively form grooves in the cable jacket. Alternatively, valleys, nicks, scratches and grooves can be introduced into the outer surface of the cable jacket during transport and/or installation, as by contact with rocks or stones as the coaxial cable is pulled from its supply reel. Such imperfections can also cause the sealing within the back nut to fail.

Accordingly, it is an object of the present invention is to provide a simple, yet effective method of reliably sealing the back nut of a coaxial cable connector over the cable jacket.

A further object of the invention is to provide such a method that would allow a given coaxial cable connector to work reliably with a larger number of types of coaxial cable without risking moisture migration failure at the interface between the back nut and the cable jacket.

A still further object of the present invention is to provide such a method that would allow a given coaxial cable connector to adapt itself to a relatively wide variation in the outer diameter of coaxial cable jackets without risking moisture migration failure at the interface between the back nut and the cable jacket.

Another object of the present invention is to provide such a method which eliminates the deleterious effects of valleys, nicks, scratches and grooves that are introduced into the outer surface of the cable jacket during transport and/or installation.

Still another object of the present invention is to provide such a method which more reliably maintains the pressure on sealing within its optimal pressure range to better seal the interface between the back nut and cable jacket.

Yet another object of the present invention is to provide a coaxial cable preparation tool that facilitates the practice of the improved sealing method as outlined above.

These and other objects of the present invention will become more apparent to those skilled in the art as the description of the present invention proceeds.

SUMMARY OF THE INVENTION

Briefly described, and in accordance with a preferred embodiment thereof, the present invention relates to a method of preparing an end of a hardline coaxial cable in a manner which improves the moisture seal formed between the protective jacket of the coaxial cable and a coaxial connector used to terminate the end of the cable. In practicing such method, the cable jacket is stripped entirely off of the end of the outer conductor of the coaxial cable for a first predetermined length that extends between the end of the cable and a first point. In addition, the method of the present invention includes the step of reducing the outer diameter of a portion of the cable jacket for a second predetermined length extending from the aforementioned first point to a second point spaced further away from the end of the cable. This step of reducing the outer diameter of the cable jacket causes the outer diameter of the cable jacket to be relatively constant over the aforementioned second predetermined length. Because the outer diameter of the cable jacket is relatively constant and smoother over such second predetermined length, an effective seal can be formed between a coaxial connector and this reduced diameter portion of the cable jacket.

In the preferred embodiment of such method, a portion of the exposed outer conductor is also removed over a third predetermined length to help expose the inner conductor. This third predetermined length is preferably shorter than the first predetermined length so that a portion of the outer conductor extends remains intact within the region of the cable wherein the cable jacket is removed entirely. Likewise, in the preferred embodiment of the present invention, a portion of the exposed dielectric covering the inner conductor is also removed over a predetermined length that is shorter than the first predetermined length to help expose the inner conductor.

The method of the present invention can be practiced most advantageously by inserting the end of the coaxial cable, prepared in the manner described above, into a coaxial connector, and compressing a seal, e.g., an O-ring, between the coaxial connector and the reduced outer diameter portion of the cable jacket located along the aforementioned second predetermined length. Typically, this O-ring may be disposed in a back nut of the coaxial connector to engage the reduced outer diameter portion of the cable jacket.

Another aspect of the present invention relates to a tool that may be used to prepare the end of a coaxial cable in order to practice such a method. The preparation tool includes an outer body having a cylindrical bore; the cylindrical bore includes a cable receiving end for receiving an end of the coaxial cable. A drive member is also provided for rotating the outer body. Such a drive member preferably includes a drive bit that may be engaged in the chuck of a drill, or rotated by a wrench.

The tool of the present invention also includes a jacket diameter reducing member secured to the outer body and directed toward the cylindrical bore thereof. This jacket diameter reducing member preferably takes the form of a blade or other cutting element for engaging and removing reducing member is spaced sufficiently apart from the longitudinal axis of the cable so that it does not entirely remove portions of the cable jacket engaged thereby.

In addition to the jacket diameter reducing member, a jacket removing member is also secured to the outer body; once again, the jacket removing member may be provided in the form of a blade or other cutting element. The jacket removing member is also directed toward the cylindrical bore of the outer body to engage the cable jacket of an inserted coaxial cable. However, the jacket removing member entirely removes portions of the cable jacket that it engages as the outer body is rotated about the end of the coaxial cable. This jacket removing member is positioned generally proximate to the jacket diameter reducing member; on the other hand, the jacket removing member is axially spaced further from the cable receiving end of the outer body than the jacket diameter reducing member.

It is preferred that the aforementioned tool also include an outer conductor removing member secured to the outer body, and directed inwardly toward the cylindrical bore thereof, for engaging and entirely removing portions of the outer conductor that are engaged thereby. The outer conductor removing member is preferably located axially further away from the cable receiving end of the outer body than said jacket removing member in order to leave some of the exposed outer conductor intact.

Preferably, the aforementioned tool also includes a coring member coupled to the drive member for being rotated thereby. The coring member cores, or removes, the dielectric material surrounding the inner conductor of the coaxial cable near the end of the coaxial cable to expose the inner conductor. In the typical case, the coring member removes at least the dielectric material exposed by the outer conductor removing member described above.

DETAILED DESCRIPTION OF THE INVENTION

Figure 1:
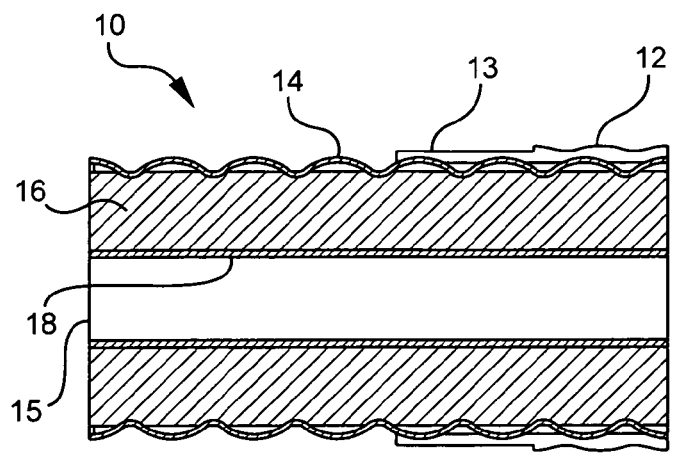
FIG. 1 is a sectional view of the prepared end of a coaxial cable according to a preferred embodiment of the method of the present invention.
Figure 2:
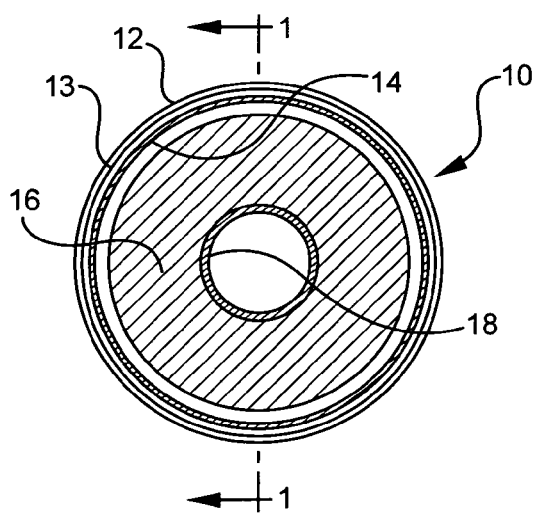
FIG. 2 is an end view of the coaxial cable shown in FIG. 1.

FIGS. 1 and 2 illustrate an end of a coaxial cable prepared in accordance with the present invention. Within FIG. 1, the coaxial cable is designated generally by reference numeral 10, and is illustrated as a coaxial cable having a corrugated metallic outer conductor 14. A protective cable jacket 12 ordinarily surrounds outer conductor 14 of coaxial cable 10 to seal out any water, moisture, or other foreign materials, and to provide some mechanical protection against abrasion or other physical impact. While FIG. 1 illustrates a corrugated style outer conductor, the present invention may also be used in conjunction with coaxial cables having smooth-walled outer conductors. Outer conductor 14 surrounds a hollow cylinder of dielectric material 16. Dielectric material 16, in turn, surrounds inner metallic tubular conductor 18. Thus, dielectric 16 separates inner conductor 18 from outer conductor 14 and maintains a desired impedance for the signal transmission path.

In practicing the method of the present invention, an end portion of cable jacket 12 (see FIG. 1) is stripped entirely off of the end of outer conductor 14 for a first predetermined length adjacent end 15 of coaxial cable 10, thereby exposing the outer surface of outer conductor 14. This first predetermined length over which the cable jacket is entirely removed extends between end 15 of coaxial cable 10 and a first point at which reduced diameter cable jacket 13 commences. In addition, a reduced outer diameter region, identified by reference numeral 13 in FIG. 1, extends over a portion of the cable jacket for a second predetermined length, extending from the aforementioned first point to a second point where reduced diameter region 13 joins cable jacket 12. It can be seen in FIG. 1 that cable jacket 12 varies in outer diameter, whereas reduced diameter region 13 maintains a relatively constant outer diameter. Accordingly, were the end of cable 10 inserted into a coaxial cable connector, a sealing housed within the back nut would make reliable, repeatable, sealing engagement with reduced diameter region 13 of coaxial cable 10.

Preferably, the preferred coaxial cable end shown in FIG. 1 is further processed to remove a portion of outer conductor 14 over a third predetermined length that is shorter than said first predetermined length to help expose the inner conductor 18. Likewise, in practicing the method of the present invention, a portion of the dielectric 16 adjacent end 15, and covering the inner conductor 18, is removed over a third predetermined length that is shorter than said first predetermined length to help expose the inner conductor.

The method of the present invention preferably includes the steps of inserting the end 15 of coaxial cable 10 into a coaxial connector (not shown), and compressing a seal (e.g., an O-ring) between the coaxial connector and a point on the cable jacket located along said second predetermined length. This o-ring can be positioned within the back end nut of the coaxial connector.

Turning to FIGS. 3-7, a tool for preparing the end 15 of coaxial cable 10 is shown, and is designated generally by reference numeral 20. Preparation tool 20 includes a generally cylindrical outer body 22 having a cylindrical bore 23 with a receiving end for receiving the end 15 of coaxial cable 10. Outer body 22 may be made from steel, aluminum, or even durable plastic. As shown best in FIGS. 5-7, the preparation tool also includes a drive member 24 that extends into bore 25 formed within outer body 22 for rotating outer body 22. Drive member 24 includes a drive bit 26 which is preferably hexagonally shaped for being chucked into a power drill or rotated by a wrench.

Figure 3:
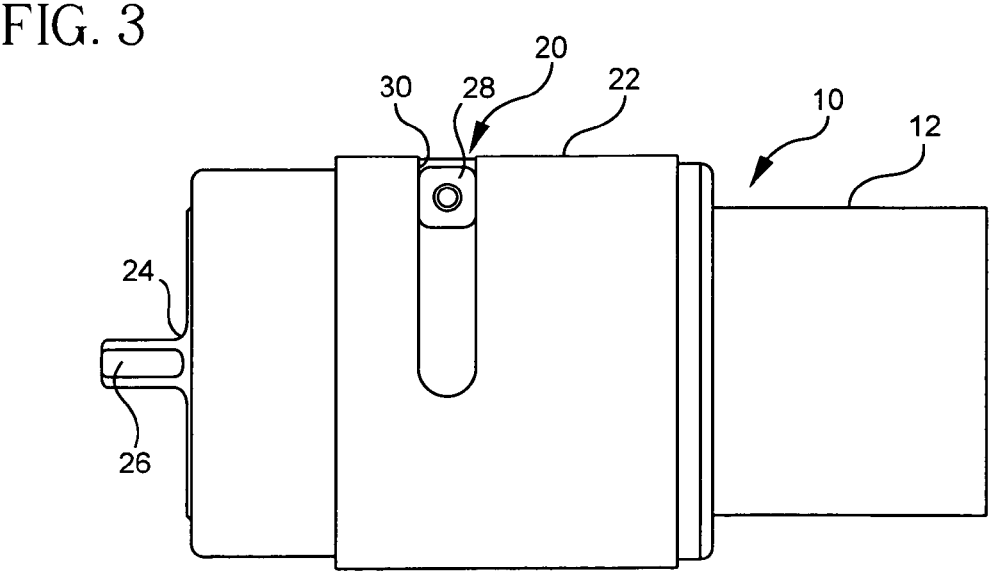
FIG. 3 is a side view of a cable preparation tool used to prepare the end of a coaxial cable in accordance with the present invention, and showing a first cutting element for cutting away a portion of the outer conductor.

As shown in FIG. 3, a first cutting element, or blade, 28 is secured to outer body 22 within support slot 30. Blade 28 is preferably carbide-tipped, and functions as an outer conductor removing member. Blade 28 is directed toward cylindrical bore 23 for engaging and entirely removing portions of outer conductor 14 engaged thereby.

Figure 4:
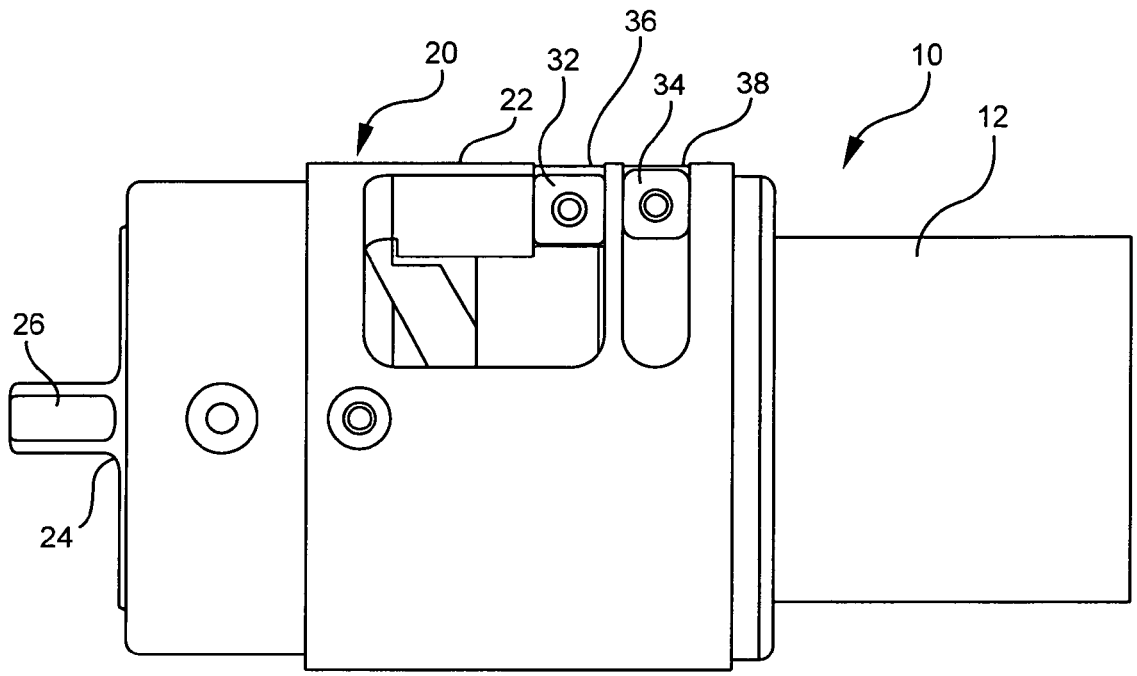
FIG. 4 is an alternate side view of the tool shown in FIG. 3, and showing second and third cutting elements used to remove all or a portion, respectively, of the cable jacket.

Turning to FIG. 4, a second cutting element, or blade, 32 is shown being secured to outer body 22 within support slot 36. Similarly, a third cutting element 34 is shown being secured to outer body 22 within support slot 38. Blades 32 and 34 are also preferably carbide-tipped.

Blade 34 functions as a jacket diameter reducing member and is directed toward the cylindrical bore 23 of outer body 22 for engaging and removing an outer portion of cable jacket 12 as outer body 22 rotates around the end of coaxial cable 10. Blade 34 reduces the outer diameter of cable jacket 12 to thinner region 13, as shown in FIG. 1; this thinner region 13 has a predetermined outer diameter that is relatively constant and smoother.

Figure 5:
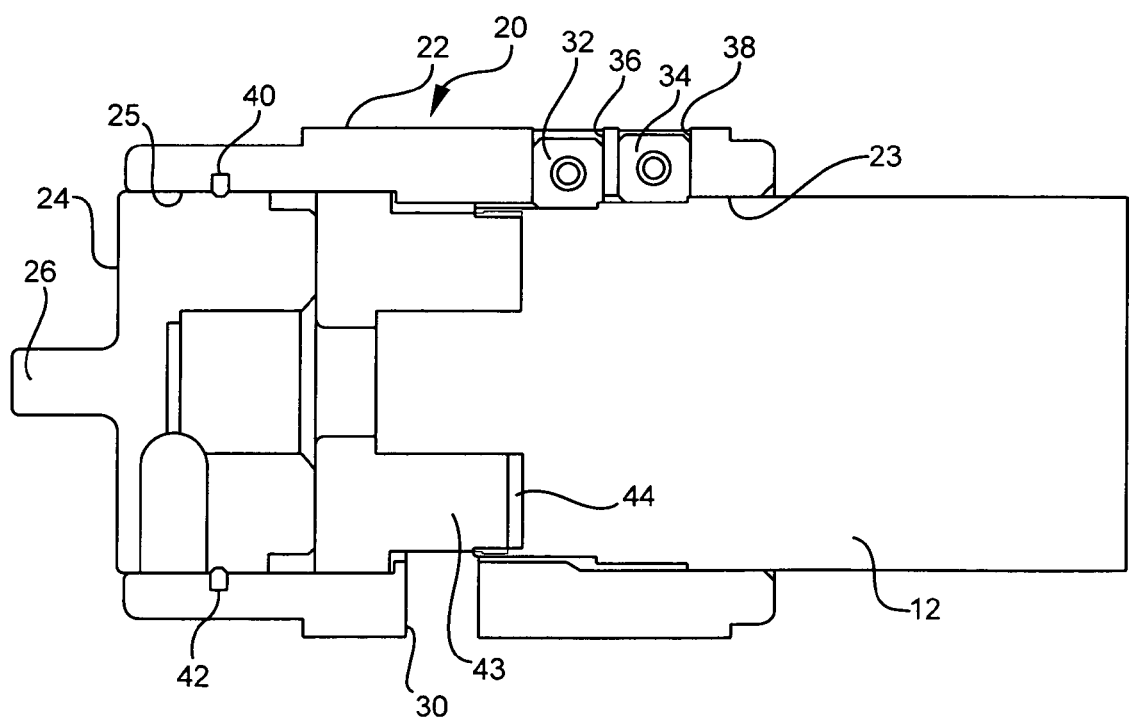
FIG. 5 is a cut-away view of the tool shown in FIG. 4, with a coaxial cable inserted therein, and illustrated a corer housed within such tool for coring out a portion of the dielectric from the exposed end of the coaxial cable.
Figure 6:
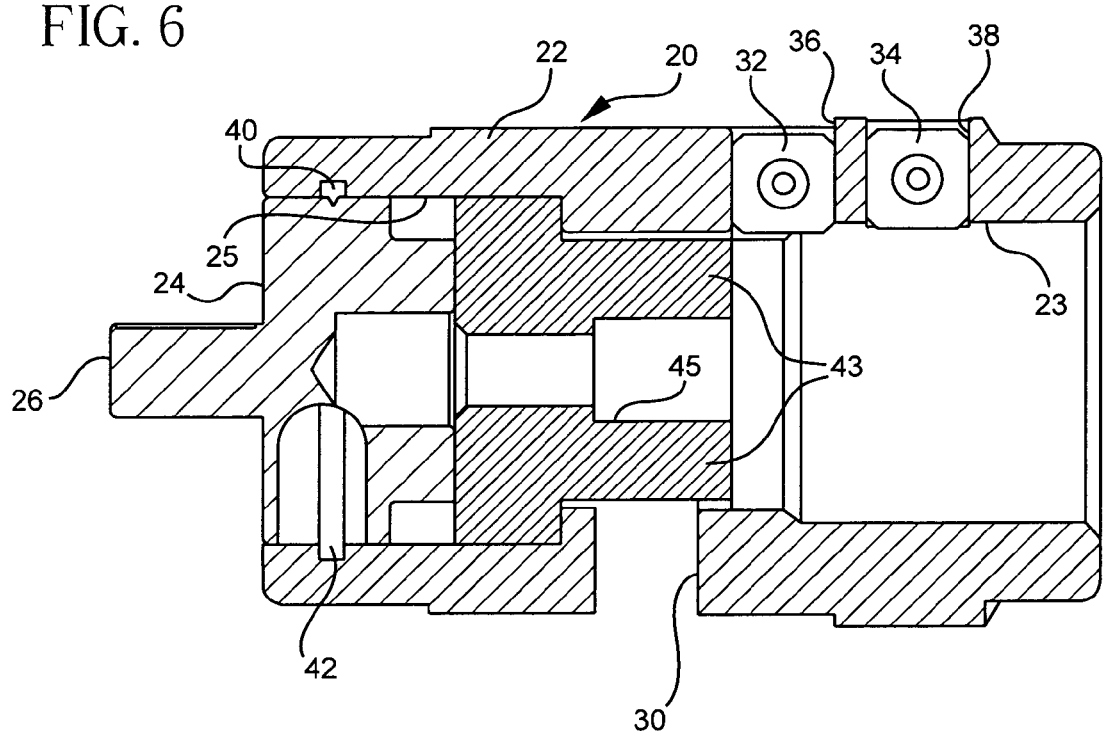
FIG. 6 is a cross-sectional view of the tool shown in FIGS. 3-5 without a coaxial cable.

On the other hand, blade 32 functions as a jacket removing member and is directed toward the cylindrical bore 23 of outer body 22 for engaging and entirely removing portions of cable jacket 12 engaged thereby as outer body 22 rotates around the end of coaxial cable 10. Blade 32 also serves to clean the exterior surface of the outer conductor as it removes the cable jacket therefrom. As shown in FIGS. 4-6, blade 32 is located proximate to blade 34, but lies further from the cable receiving end of outer body 22 than blade 34. Likewise, blade 28, which serves to cut the outer conductor, lies further from the receiving end of outer body 22 than blade 32.

Figure 7:
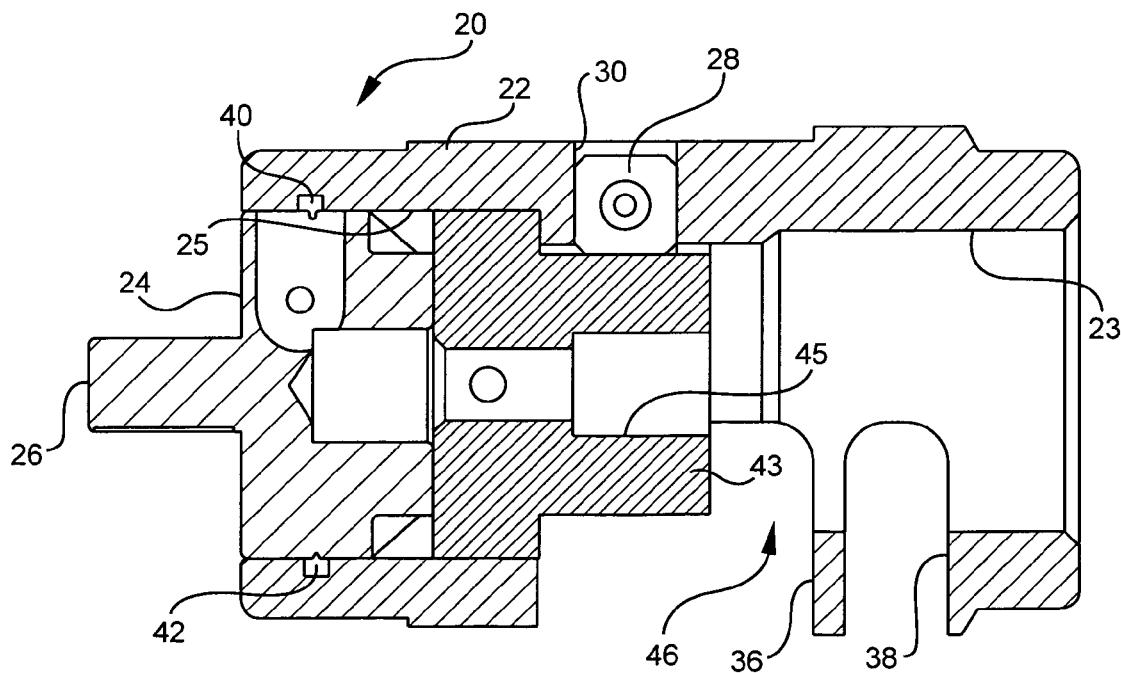
FIG. 7 is an alternate cross-sectional view of the tool shown in FIGS. 3-6 without a coaxial cable.

Now referring to FIG. 5, coring member 43 is coupled to drive member 24 for being rotated thereby. Coring member 43 includes a blade 44 used to core away the dielectric 16 (see FIG. 1) surrounding inner conductor 18 at the end of coaxial cable 10 to expose inner conductor 18. Coring member 43 has an inner bore 45 (see FIGS. 6 and 7) for receiving the inner conductor of coaxial cable 10. Coring member 43 thereby cores away the dielectric material that is exposed by the outer conductor removing member. In addition, FIG. 5 shows two keys 40 and 42 that can be used to lock driver 24 with inner bore 25 of outer body 22. Turning to FIG. 7, it will be noted that there is a rather large gap 46 formed in outer body 22. This gap 46 is provided to allow materials cut by blades 28, 32, and 34, and by coring blade 44, to easily escape from the tool.

Those skilled in the art will now appreciate that a tool and method have been described which provide a method of reliably sealing the back nut of a coaxial cable connector over the cable jacket. The described method and tool allow a given coaxial cable connector to work reliably with a larger number of types of coaxial cable, and also eliminates the deleterious effects of valleys, nicks, scratches and grooves that are introduced into the outer surface of the cable jacket during transport and/or installation.

While the present invention has been described with respect to a preferred embodiment thereof, such description is for illustrative purposes only, and is not to be construed as limiting the scope of the invention. Various modifications and changes may be made to the described embodiment by those skilled in the art without departing from the true spirit and scope of the invention.

The invention claimed is:

1. A method of preparing an end of a coaxial cable, the coaxial cable including a inner conductor, an outer conductor, a dielectric therebetween, and a protective outer cable jacket, wherein said method improves the seal between the cable jacket and a coaxial connector, said method comprising the steps of:
   a. stripping the cable jacket entirely off of the end of the outer conductor for a first predetermined length, said first predetermined length extending between the end of the coaxial cable and a first point;
   b. removing an outer portion of the cable jacket while maintaining an inner portion of the cable jacket for a second predetermined length, thereby reducing the outer diameter of a portion of the cable jacket for said second predetermined length, said second predetermined length extending from the first point to a second point;
   c. said step of reducing the outer diameter of the cable jacket including the step of making the outer diameter of said cable jacket relatively constant and smoother over said second predetermined length;
   d. inserting the end of the coaxial cable into a coaxial connector; and
   e. compressing a seal between the coaxial connector and a point on the cable jacket located along said second predetermined length.

2. The method of claim 1 including the further step of removing a portion of the outer conductor over a third predetermined length that is shorter than said first predetermined length to help expose the inner conductor.

3. The method of claim 1 including the further step of removing a portion of the dielectric covering the inner conductor over a third predetermined length that is shorter than said first predetermined length to help expose the inner conductor.

4. The method of claim 1 wherein the step of compressing a seal includes the steps of compressing a seal between a back nut of the coaxial connector and a point on the cable jacket located along said second predetermined length.

* * * * *